US008332150B2

(12) United States Patent
Kulak et al.

(10) Patent No.: US 8,332,150 B2
(45) Date of Patent: Dec. 11, 2012

(54) METHOD AND APPARATUS FOR MONITORING STORM ACTIVITY ON THE EARTH'S SURFACE IN REAL TIME

(75) Inventors: Andrzej Kulak, Cracow (PL); Jerzy Kubisz, Cracow (PL); Stanislaw Micek, Cracow (PL); Adam Michalec, Niepolomice (PL); Zenon Neickarz, Morawica (PL); Michal Ostrowski, Olkusz (PL); Stanislaw Zieba, Cracow (PL)

(73) Assignee: Uniwersytet Jagiellonski, Krakow (PL)

( * ) Notice: Subject to any disclaimer, the term of this patent is extended or adjusted under 35 U.S.C. 154(b) by 461 days.

(21) Appl. No.: 12/663,845

(22) PCT Filed: Jun. 11, 2008

(86) PCT No.: PCT/IB2008/052296
§ 371 (c)(1),
(2), (4) Date: Dec. 10, 2009

(87) PCT Pub. No.: WO2008/152587
PCT Pub. Date: Dec. 18, 2008

(65) Prior Publication Data
US 2010/0171485 A1 Jul. 8, 2010

(30) Foreign Application Priority Data

Jun. 11, 2007 (PL) .......................... 382624
May 30, 2008 (PL) .......................... 385320

(51) Int. Cl.
*G01W 1/00* (2006.01)
(52) U.S. Cl. ........................................ 702/4
(58) Field of Classification Search ......... 702/4; 324/72
See application file for complete search history.

(56) References Cited

U.S. PATENT DOCUMENTS 5,305,210 A * 4/1994 Kuzma et al. .................... 702/4
5,537,318 A * 7/1996 Moses et al. ..................... 702/4
(Continued)

FOREIGN PATENT DOCUMENTS
WO WO2005073752 8/2005

OTHER PUBLICATIONS

A.V.Shvets, "A technique for reconstruction of global lightning distance profile from background Schumamm resonance signal", Journal of Atmospheric and Solar-Terrestrial Physics, 63 (2001), pp. 1061-1074.

(Continued)

*Primary Examiner* — Jonathan C Teixeira Moffat
*Assistant Examiner* — Xiuquin Sun
(74) *Attorney, Agent, or Firm* — Mark M Friedman

(57) ABSTRACT

To monitor storm activity in real time, ELF signals generated in an Earth-ionosphere resonator are received via two active magnetic induction antennas, recorded, and sent to an electronic data processing unit for spectral analysis. The resulting power spectra are matched with resonance curves to parametrize the power spectra by a set of observation parameters that are based on ELF field resonance propagation models in the Earth-ionosphere resonator and that depend on distance and intensity of electrical spark discharges of storm cells. The observation parameters are compared with base parameters of a model parameter database. The base parameters that best approximate the observation parameters are used for developing a map of location and intensity of the electrical spark discharges.

8 Claims, 5 Drawing Sheets

U.S. PATENT DOCUMENTS 6,215,294 B1* 4/2001 Coleman .................. 324/72
2007/0156339 A1* 7/2007 Oettinger .................. 702/4

OTHER PUBLICATIONS

Yoshiaki Ando et al., "2-D Finite Difference Analyses of Schumann Resonance and Identification of Lightning Distribution", Transactions of The Institute of Electrical Engineers of Japan, vol. 124, No. 12, 2004, pp. 1225-1231.

A.P.Nikolaenko et al., "A modified technique to locate the sources of ELF transient events", Journal of Atmospheric and Terrestrial Physics, vol. 56, No. 11 (1994), pp. 1493-1498.

A.V.Shvets, "ELF Tomography of the World Thunderstorm Activity", Telecommunication and Radio Engineering, 55(8), 2001, pp. 43-51.

Yoshiaki Ando et al., "Finited analyses of Schumann resonance and reconstruction of lightning distribution", Radio Science, vol. 40, RS2002, 2005.

A. Kulak et al., "Studies of ELF propagation in the spherical shell cavity using a field decomposition method based on asymmetry of Schumann resonance curves", Journal of Geophysical Research. vol. 111, A10304, 2006.

* cited by examiner

METHOD AND APPARATUS FOR MONITORING STORM ACTIVITY ON THE EARTH'S SURFACE IN REAL TIME

RELATED APPLICATIONS

This patent application is a National Stage of PCT/IB2008/052296 filed on Jun. 11, 2008, which claims priority of Polish Patent Application No. P382624 filed Jun. 11, 2007 and Polish Patent Application No. P 385320 filed May 30, 2008, the contents of which are incorporated herein by reference.

TECHNICAL FIELD

The subject of the invention is a method and an apparatus for monitoring storm activity on the Earth's surface in real time used for remote measurements of storm-centre activity and to determine their location. Monitoring of storm activity is relevant in the safety of air and sea transport as well as playing an important role in weather forecasting.

BACKGROUND ART

Today there are several methods to record electrical spark discharges in the atmosphere, occurring within a thundercloud, between clouds and/or between a cloud and the ground.

The first method of monitoring storm activity is based on optical satellite observations of lightning occurring, as mentioned earlier, within thunderclouds, between the clouds and/or between the clouds and the ground. The method provides detailed information from an area that is observed directly by instruments mounted on a satellite. The zone observed covers ca. $10^5$ km², which constitutes only a small part of the Earth's surface. The orbital observation system, even with a broadly expanded network of satellites cannot ensure a reliable storm activity global monitoring system.

The second method of tracking storms is associated with the detection of electromagnetic signals within VLF, HF, and VHF radio frequencies, generated during the electrical spark discharges in the atmosphere. This method allows an assessment of discharge intensity and their location. Its disadvantage, however, is a range the signals, which—within these frequencies—is limited for distances up to several hundred kilometers within HF, and several thousand kilometers within VLF. Covering large areas to allow observation using stations requires a dense network of tracking stations. At present, the most developed monitoring system carries out analyses of signals registered simultaneously within VLF and HF frequencies. It operates only in highly-developed countries, thus it covers only a small percentage of the Earth surface.

The third method is based on tracking signals within VLF only. The range of a single station is up to one thousand kilometers. Currently, the world system is based on 27 measuring stations.

Propagation of electromagnetic field signals of extremely low frequency (ELF) is known from published results of research conducted by scientists of the Jagiellonian University, Krakow, Poland, presented in the paper titled "*Studies of ELF propagation in the spherical shell cavity using a field decomposition method based on asymmetry of Schumann resonance curves*", Journal of Geophysical Research, Vol. 111, A10304, doi:10.1029/2005JA011429, 2006. In conformity with the thesis presented in this paper the curve asymmetry and the variability of the peak resonance frequencies in the observed ELF spectra arise from superimposition of the standing wave field, which create the resonance modes with the field of wave travelling out from the sources. The problem to be solved was whether it was possible to separate components of both fields and to measure them independently in the resonator. A new approach to this issue has been proposed and it consists in the measuring of spectrum asymmetry or a signal spectrum obtained by the observation of components of the electrical field or magnetic field with a single antenna. In this approach it was assumed that the signal spectrum in any point of the resonator includes a symmetrical part related to the resonance component field and a nonsymmetrical part connected with the travelling wave field. The power spectrum of a field component $|a(\theta, f)|^2$ has been determined using the formula:

$$|a(\theta, f)|^2 \approx \sum_{k=1}^{K} \frac{p_k(\theta) \cdot [1 + e_k(\theta) \cdot (f - f_{rk}^*)]}{(f - f_{rk}^*) + (\gamma_k^*)^2}$$

This formula enables the determination of the approximate distance $\theta$ from any point of a resonator to a single progressive wave source.

The observation methods of atmospheric discharges discussed above, even assuming a considerable expansion of the observation base, do not enable global monitoring of storm activity over the entire surface of the Earth. Also, none of the above methods guarantees a 100% detection efficiency of electrical spark discharges in the atmosphere. It is currently estimated that the effectiveness of methods mentioned is between 60 and 80 percent, depending on the method applied, and the signal analysis algorithms used.

AIM OF THE INVENTION

The purpose of the invention is to provide a method and an apparatus for global monitoring of storm activity across the entire surface of the Earth.

DISCLOSURE OF THE INVENTION

The method for monitoring storm activity according to the present invention, is based on analyses of electromagnetic signals induced by electrical spark discharges in the atmosphere in storm cells, similarly to the methods mentioned above. The idea of the invention is that Extremely Low Frequency (ELF) electromagnetic field signals induced within the Earth-ionosphere resonator are recorded, then undergo spectral analysis, based on resonance propagation models concerning ELF field in Earth-ionosphere resonator. Next, features dependent on distances between the location of the electrical spark discharges and antennas, i.e. source distances, and intensity are separated and compared with the parameters of the model database. The best-approximated set of base parameters identifies the location and intensity of those sources. The analysis can be conducted in real time, and its results may be demonstrated in the form of storm activity maps.

Due to the special properties of wave resonance propagation within ELF field a single device is able to record signals coming from all electrical spark discharges in the atmosphere of the Earth, and the registered signals enable explicit preparation of storm activity maps at distances of up to 10 000 km. The application of several devices located on various continents allows clear-cut imaging of storm activity in geographical coordinates on a global scale.

Preferably, ELF electromagnetic field signals are recorded in zones which are free from local electrical field sources using two horizontal magnetic antennas arranged perpendicularly in respect to each other, and located on the surface, or close under the ground surface, and placed along NS and EW directions. The signals, after being amplified, filtered and processed for example at a sampling frequency of 180 Hz into digital observation signals are transmitted by radio to an electronic data processing unit, where they undergo spectral analysis. The generated signal power spectra are then matched with resonance curves, which allow a parameterisation of these spectra. Next, these parameters are compared with base parameters stored in the model database, which has been created with the knowledge of ELF wave propagation model in the Earth-ionosphere resonator or cave or waveguide. Using a procedure to minimise the deviation of observation parameters from those base parameters, a selection is made with respect to a set of base parameters, which values would be best approximated. A set of base parameters which reconstruct the location and intensity of the storm sources where electrical spark discharges in the atmosphere occur. On the basis of the set of base parameters a map of sources can be prepared.

In order to perform a parameterisation for each of power spectrum $S_x$, $S_y$, it is recommended to match resonance curves using the formula:

$$S(\omega) = b + \frac{a}{\omega^\alpha} + \sum_{k=1}^{K} \frac{p_k \cdot [1 + e_k \cdot (\omega_k - \omega)]}{(\omega_k - \omega)^2 + (\Gamma_k)^2}$$

where:
  $S(\omega)$—matched power spectrum;
  a—parameter describing background colour noises;
  b—parameter describing background broad-band noises;
  $\alpha$—spectral index of colour noises;
  $\omega$—rate (pulsation);
  $p_k$—maximum power value of k-th resonance peak;
  $e_k$—parameter of asymmetry of k-th resonance peak;
  $\omega_k$—resonance rate of k-th resonance peak which is equal to $2\pi f_k$;
  $\Gamma_k$—half-width of k-th resonance peak.

Another idea of the invention is an apparatus for monitoring storm activity on the Earth surface in real time, equipped with two inductive, active, magnetic antennas perpendicular against each other along NS and EW directions and placed on the ground surface or close under it and connected to each other by screened wires to the block recording observation signals with two identical signal paths and amplifiers, filters, analog-to-digital converters and a control system, the clock of which is synchronised via the system receiver with GPS time, and in which the data electronic processing unit is programmed according to an algorithm applied to the spectral analysis of ELF signals and an algorithm determining features dependent on the distance and activity of storm discharge sources.

Preferably, the block recording observation signals is connected to the transmitting antenna transmitting data processed in the analog-to-digital converter whereas the counting unit is connected to the receiving antenna communicating with the transmitting antenna connected to the block recording observation signals.

BRIEF DESCRIPTION OF THE DRAWINGS

The invention will now be described by way of example and with reference to the accompanying drawings in which.

BEST MODE FOR CARRYING OUT THE INVENTION

Figure 1:
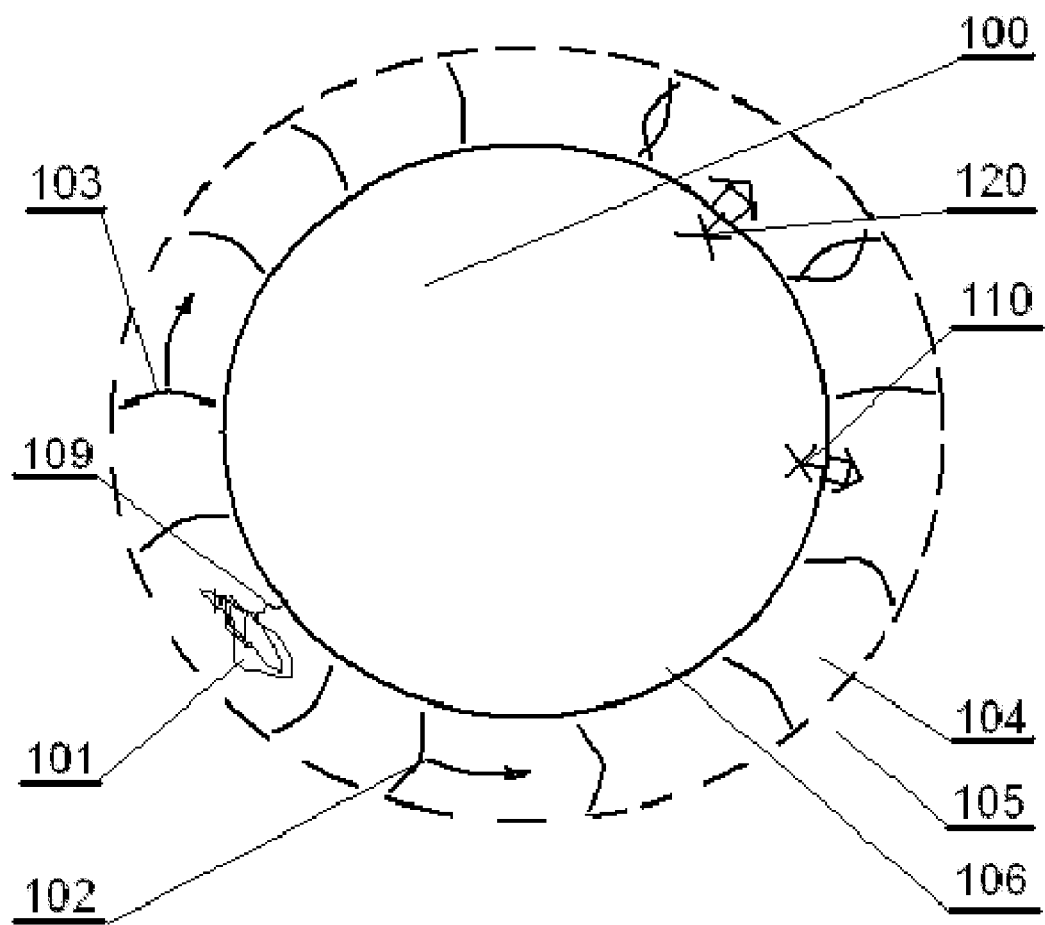
FIG. 1 shows the Earth and a storm centre generating ELF electromagnetic waves.

The embodiments presented in the drawings are intended only for illustrative purpose and do not limit the scope of the invention as defined by the accompanying claims.

The apparatus for monitoring storm activity on the Earth surface in real time, for which a solution according to the invention will be presented with an example of a storm activity monitoring apparatus used for remote measurements of storm centre activity and its location on the Earth surface, is shown in FIGS. 1-5. Components or units of the apparatus accomplishing the same functions are marked in all figures with the same numbering or marks differing with the first digit only, which is assigned to the specific figure and its number.

FIG. 1 shows schematically the Earth 100 with a storm centre 101. The storm centre generates ELF electromagnetic field signals in the air cavity 104 or, in other words, in the Earth-ionosphere resonator, the signals being ELF electromagnetic waves 102 and 103 propagating in all directions in the Earth-ionosphere cavity 104. In FIG. 1 a single atmospheric electrical spark discharge 109 is shown which generates among other things the first electromagnetic wave 102 propagating anticlockwise and the second one 103 propagating clockwise in the air cavity 104 created between the ionosphere 105 and the ground 106. These waves circle the Earth many times interfering with each other and also reaching the receiving antennas 110, 120 arranged in favourable position perpendicularly in respect to each other. Due to the interference of the waves generated by the storm centre 101, waves of specific frequencies fade and in this way a series of resonance peaks is created.

Figure 2:
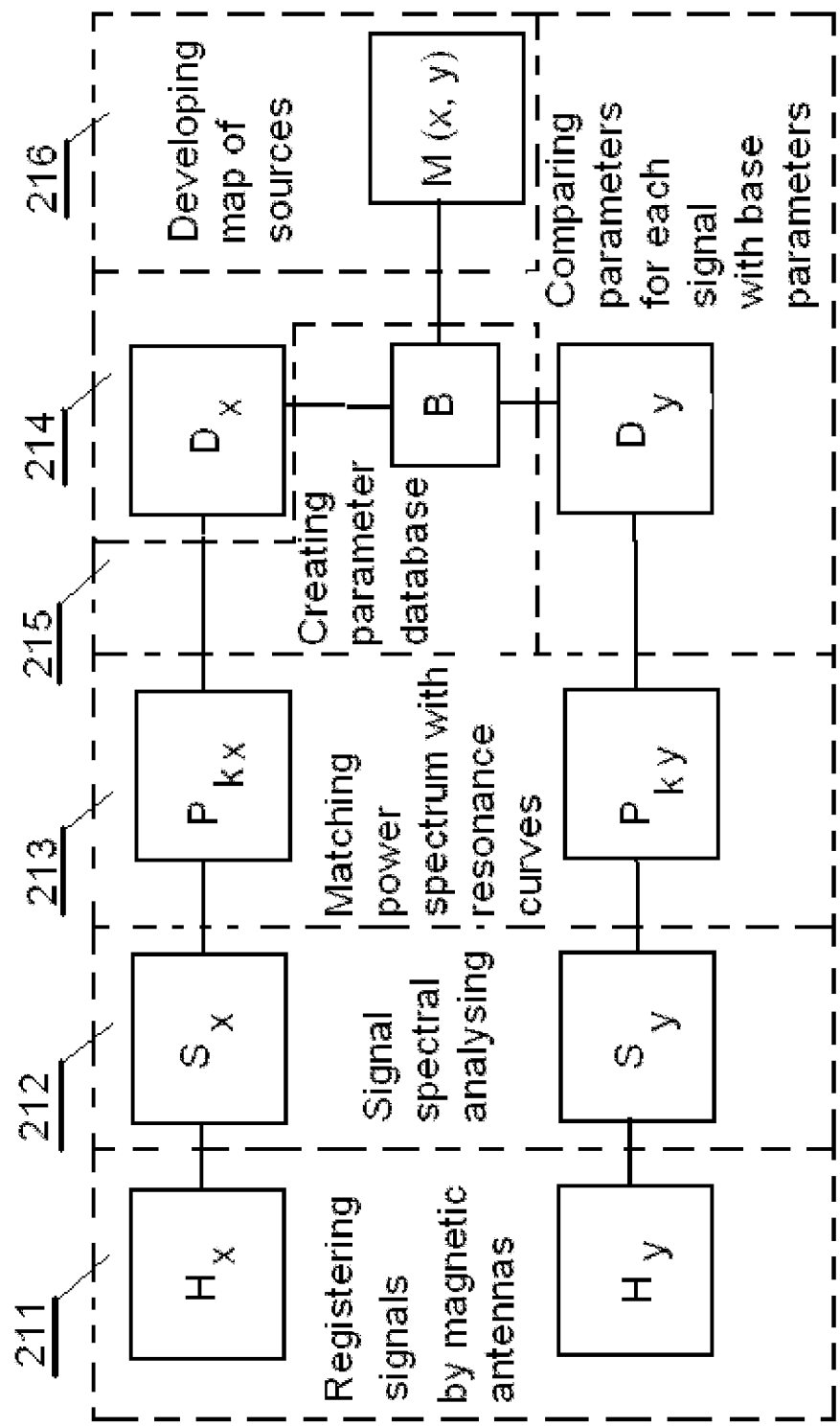
FIG. 2 shows a flow diagram of a method for monitoring storm activity.

FIG. 2 shows schematically a flow diagram of a method for monitoring storm activity on the Earth's surface in real time. In the first step 211, $H_x$, $H_y$ components of electromagnetic field, created by electrical spark discharges, generate signals which are registered by two magnetic antennas. In step 212, these signals are subject to identical processes of spectral analysis, as a result of which power spectrum $S_x$ and $S_y$ is generated. Due to resonance nature of ELF signal propagation in the Earth-ionosphere cavity, the spectra take a form of a series of resonance peaks, associated with subsequent propagation maxima. In step 213, each power spectrum $S_x$ and $S_y$ is matched with resonance curves, described by the specific formula described in details later. The result of the matching procedure is the parameterisation of the spectra. Each of the spectra $S_x$ and $S_y$ is assigned with sets of observation parameters $p_k$, $f_k$, $\gamma_k$ and $e_k$. In step 214, sets of parameters for each signal are compared with base parameters $p_{ok}$, $f_{ok}$, $\gamma_{ok}$ and $e_{ok}$, which are stored in a model parameter database B. The task of the comparison system is the selection of a set of base parameters $p_{ok}$, $f_{ok}$, $\gamma_{ok}$ and $e_{ok}$, whose values are as close to the set of observation parameters $p_k$, $f_k$, $\gamma_k$ and $e_k$ as possible. To this end, one of the available minimisation procedures is applied, used to minimise the deviation of observation parameters $p_k$, $f_k$, $\gamma_k$ and $e_k$ from base parameters $p_{ok}$, $f_{ok}$, $\gamma_{ok}$ and $e_{ok}$. The model parameter database B is made with the application of knowledge of the ELF wave propagation model in the Earth-ionosphere cavity in step 215 after, for example, confirmation of the observed electrical spark discharges in the atmosphere. As there is a characteristic set of base parameters for each distance between the observer, i.e. antennas, and the source, i.e. an electrical spark discharge, and for each discharge intensity, thus the assignment of the set of observation parameters $p_k$, $f_k$, $\gamma_k$ and $e_k$ to the set of base parameters $p_{ok}$, $f_{ok}$, $\gamma_{ok}$ and $e_{ok}$ enables the mapping of source locations and their intensity. In step 216, a map of sources is prepared. The resolution ability of the obtained map is strictly dependent on the number of spectral observation parameters $p_k$, $f_k$, $\gamma_k$ and $e_k$, obtained in step 213 of signal decomposition, and on the level of local noise accompanying the measurement. The observation parameters $p_k$, $f_k$, $\gamma_k$ and $e_k$ are features dependent on distance and intensity of the electrical spark discharges which help to reconstruct the location and intensity of the electrical spark discharges and form a basis on which a map of storm sources ($M_{(x, y)}$) can be drawn. Map ambiguities depend strictly on the form of base sets of field distribution, i.e. they are a derivative of the propagation model assumed.

Figure 3A:
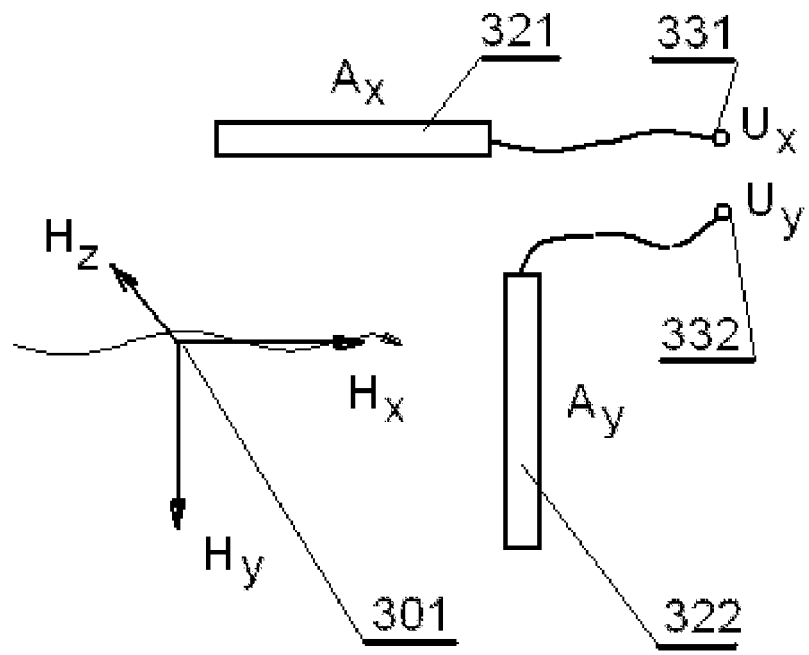
FIG. 3A shows receiving antennas in ELF electromagnetic field.
Figure 4:
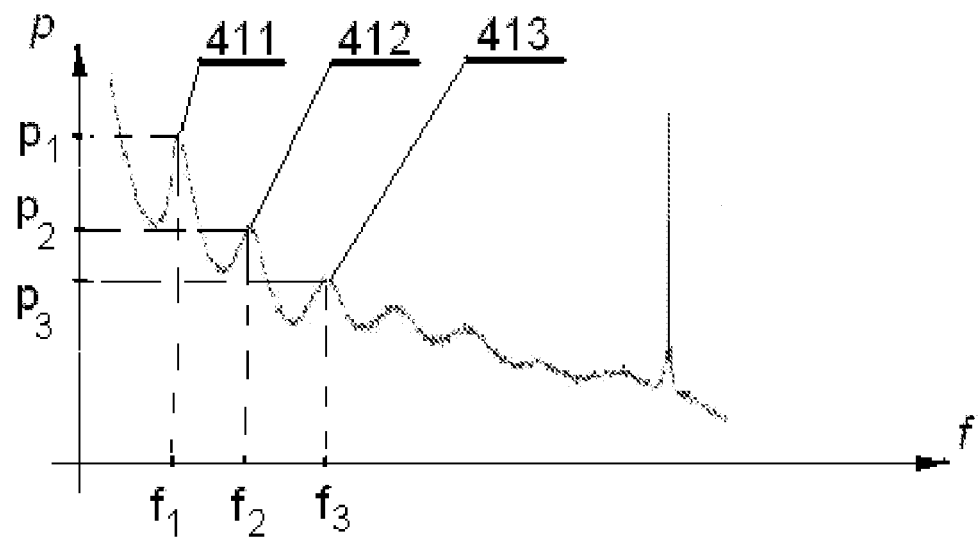
FIG. 4 shows three chosen resonance peaks related to the first three consecutive propagation maxima.

The ELF electromagnetic field 301, shown schematically in FIG. 3A, created in the air cavity has components $H_x$, $H_y$, $H_z$ of which the $H_x$, and $H_y$ ones are received by two receiving horizontal, directional antennas $A_x$ 321 and $A_y$ 322, ideally perpendicular in respect of each other, and placed in an Earth zone free of local electrical field sources. The antennas $A_x$ 321 and $A_y$ 322 are normally inductive, active, magnetic antennas of length, for example 1 m with a core cross section of 1 cm². Preferably, the antennas $A_x$ 321 and $A_y$ 322 are screened against extraneous electrical fields, if any, and placed on the ground surface 106 or close under it, usually along NS and EW directions. Due to the ELF electromagnetic field 301 signals $U_x$ 331 and $U_y$ 332 are generated in these directional receiving antennas $A_x$ 321 and $A_y$ 322.

Figure 3B:
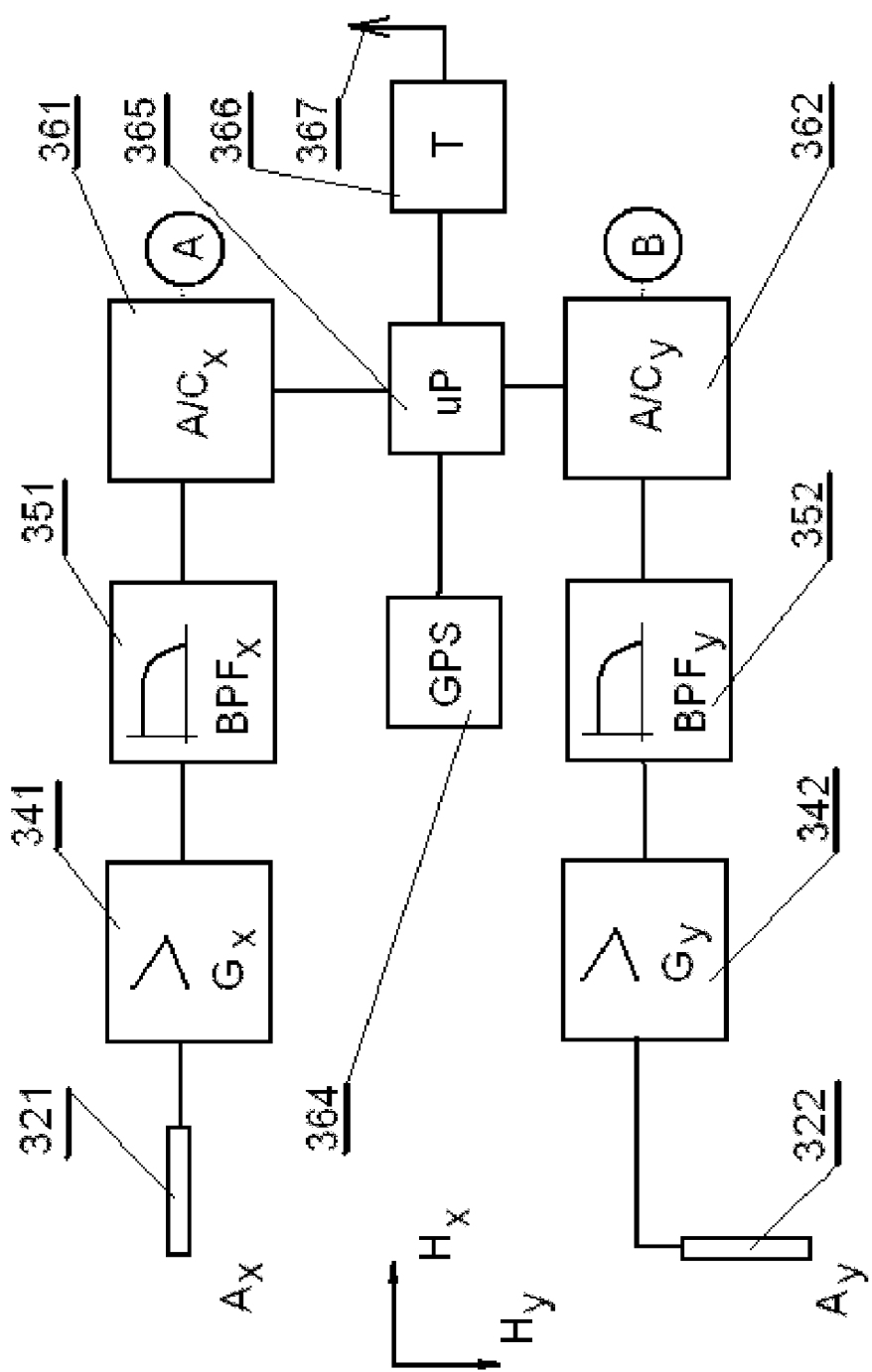
FIGS. 3B and 3C show an apparatus for monitoring storm activity on the Earth surface in real time.
Figure 3C:
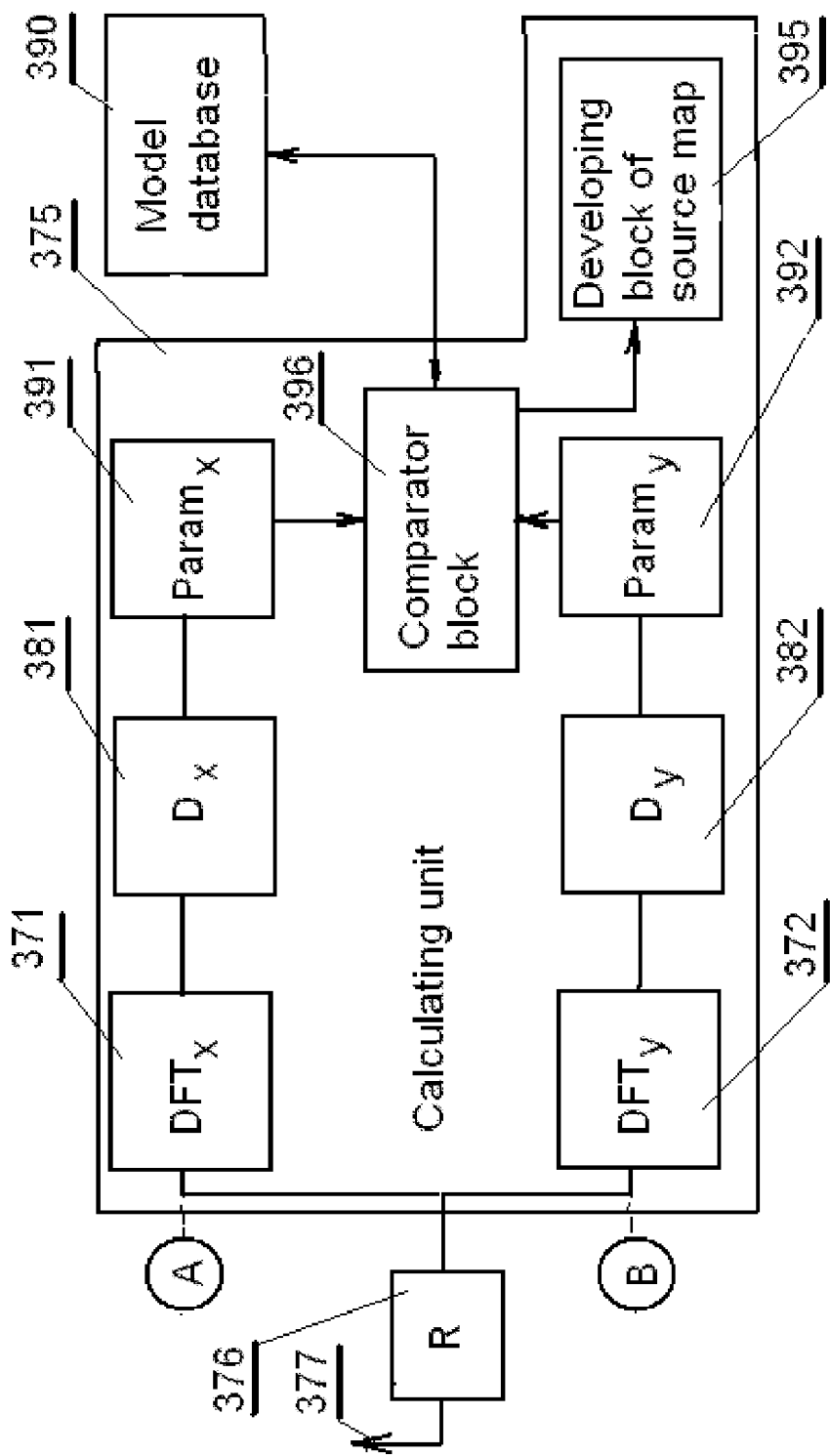

Before the signals $U_x$ 331 and $U_y$ 332 are subjected to spectral analysis based on resonance propagation models of ELF field in the Earth-ionosphere waveguide or in the Earth-ionosphere cavity, in short—the air cavity, and the separation of features distance and source intensity dependant, the signals $U_x$ 331 and $U_y$ 332 generated in the directional, magnetic, receiving antennas $A_x$ 321 and $A_y$ 322 are transmitted to a block which records the observation signals on two identical processing paths, preferably separate ones, as shown in FIGS. 3B and 3C to an input of broad-band low-noise amplifiers $G_x$ 341 and $G_y$ 342 by screened wires of the length of e.g. 100 m and then, after being amplified, they are passed through low-pass antialiasing filters $BPF_x$ 351 and $BPF_y$ 352 of pass band, for example, 1-60 Hz and next processed from analog to digital form, e.g. in 16-bit analog-to-digital converters $A/C_x$ 361 and $A/C_y$ 362 connected with a control system uP 365. Sampling of the signal is carried out synchronously in both analog-to-digital converters $A/C_x$ 361 and $A/C_y$ 362 with the frequency e.g. 180 Hz. The apparatus with the two above and below described blocks is equipped with a GPS receiver 364 thanks to which a control system clock is synchronised with GPS time. Digital signals $U_x$ 331 and $U_y$ 332 are then encoded and directed to a low power radio transmission system 366 with an antenna T 367 transmitting data processed in the analog-to-digital converter or to the waveguide line. Another solution is also possible where digital signals $U_x$ 331 and $U_y$ 332 could be transmitted to a control system for further analysis, e.g. to a PC with the use of communication links. However, with such a solution a risk of introducing noises to measurement paths might occur. In the favorable solution presented in FIG. 3B all apparatus blocks described so far are located away of electrical lines and are supplied from an autonomous power supply source, whereas transmission of signals to the counting unit, e.g. PC, as mentioned above, takes place by radio or light.

In the presented example digital signals $U_x$ 331 and $U_y$ 332 are received by a radio receiving system 376 located several, e.g. 3-10 kilometers away from the antennas, and equipped with a receiving antenna 377, then decoded and sent to a counting unit 375, e.g. a PC supplied from the mains. The counting unit 375, being an electronic processing system, is programmed according to an algorithm of ELF signal spectral analysis and an algorithm related to the determination of features of distance and activity dependant the sources of electric spark storm discharges. In the counting unit 375, digital signals $U_x$ 331 and $U_y$ 331 are subjected to identical processes of spectral analysis to generate power spectra $S_x$, $S_y$ of observation signals $U_x$ 231 and $U_y$ 231 and with matching resonance curves to them with the use of the Fourier transform in blocks $DFT_x$ 371 and $DFT_y$ 372. Due to the resonance nature of the propagation of ELF observation signals in the Earth-ionosphere cavity, the spectra are in a form of a resonance peaks series or peaks 411, 412, and 413 connected with consecutive propagation maxima as presented in Table 1 and in graphical form in FIG. 4.

TABLE 1

| Mod Number k | Mod Frequency f | Mod Power p | Mod Eccentricity e | Mod width Γ |
|---|---|---|---|---|
| 1 | $f_1$ | $p_1$ | $e_1$ | $\gamma_1$ |
| 2 | $f_2$ | $p_2$ | $e_2$ | $\gamma_2$ |
| 3 | $f_3$ | $p_3$ | $e_3$ | $\gamma_3$ |
| 4 | $f_4$ | $p_4$ | $e_4$ | $\gamma_4$ |
| ... | ... | ... | ... | ... |
| a | | | | |
| b | | | | |
| α | | | | |

At the next stage in matching blocks $D_x$ 381 and $D_y$ 382 resonance curves expressed with following formula are matched to each of power spectra $S_x$ and $S_y$.

$$S(\omega) = b + \frac{a}{\omega^\alpha} + \sum_{k=1}^{K} \frac{p_k \cdot [1 + e_k \cdot (\omega_k - \omega)]}{(\omega_k - \omega)^2 + (\Gamma_k)^2}$$

where:
  $S(\omega)$—matched power spectrum
  b—parameter describing background colour noises
  a—parameter describing background broad-band noises
  α—spectral index of colour noise;
  ω—rate (pulsation);
  $p_k$—maximum power value of k-th resonance peak;
  $e_k$—parameter of asymmetry of k-th resonance peak;
  $\omega_k$—resonance rate of k-th resonance peak which is equal to $2\pi f_k$;
  $\Gamma_k$—half-width of k-th resonance peak.

The above formula was adopted from the paper titled "*Studies of ELF propagation in the spherical shell cavity using a field decomposition method based on asymmetry of Schumann resonance curves*", Journal of Geophysical Research, Vol. 111, A10304, doi:10.1029/2005JA011429, 2006, after completing it with a parameter describing background colour noises, a parameter describing background broad-band noises, and a colour noise spectral index. Adding the parameter a describing background colour noises, the parameter b describing background broad-band noises and the colour noise spectral index a was preferable since, as was observed, it improved the quality of matching curves to the observed background and increased the accuracy of spectral parameter determination needed for map creation. It should be stressed that the parameters a and b as well as the index α are determined but not used for map creation.

As a result of using of the matching procedure a spectrum parameterisation ensues which takes place in parameterisation blocks Param$_x$ 391 and Param$_y$ 392. To each spectrum S$_x$ and S$_y$ four current observation parameters $p_k$, $f_k$, $\gamma_k$ and $e_k$ are attributed for each k-th mode, for whose parameterisation is carried out. At the next stage these four observation parameters $p_k$, $f_k$, $\gamma_k$ and $e_k$ of each of signals U$_x$ and U$_y$ are compared in a comparator 396 with sets of base parameters $p_{ok}$, $f_{ok}$, $\gamma_{ok}$ i $e_{ok}$ stored in the model parameter database B 390 created on the base of the knowledge of the ELF wave propagation within the Earth-ionosphere cavity. The task of comparator 396 is to select a set of base parameters $p_{ok}$, $f_{ok}$, $\gamma_{ok}$ and $e_{ok}$ of values closest to the set of observation parameters $p_k$, $f_k$, $\gamma_k$ and $e_k$. To this end one of the procedures of the minimisation of parameters $p_k$, $f_k$, $\gamma_k$ and $e_k$ deviation from $P_{ok}$, $f_{ok}$, $\gamma_{ok}$ and $e_{ok}$ ones is employed. The 390 is created on the strength of the knowledge of the ELF wave propagation within the Earth-ionosphere cavity on the basis of long-term observations. Since for each distance between the observer and the source, and for each discharge intensity, there is a specific parameter set, the assignment of observation parameter set $p_k$, $f_k$, $\gamma_k$ and $e_k$ to the base parameter $p_{ok}$, $f_{ok}$, $\gamma_{ok}$ and $e_{ok}$ allows the reconstruction of the source location and its intensity. In other words, the observation parameters $p_k$, $f_k$, $\gamma_k$ and $e_k$ are compared with the set of base parameters $p_{ok}$, $f_{ok}$, $\gamma_{ok}$ and $e_{ok}$ which are parameters of model parameter base B. The set of base parameters $p_{ok}$, $f_{ok}$, $\gamma_{ok}$ and $e_{ok}$, after being selected as the best approximation of the set of observation parameters $p_k$, $f_k$, $\gamma_k$ and $e_k$, reconstructs the location and intensity of electrical spark discharges or discharge sources and/or storm centres. The electronic processing unit in the preferred example has been programmed according to the algorithm of ELF signal spectral analysis and the algorithm of determination features dependant on distance and activity of storm discharge with the use of the Fourier transform, as is well-known from many papers on spectral analysis.

At the next stage a map $M_{(x, y)}$ of sources is developed, or in other words, in the generation block 395 a source map $M_{(x, y)}$ of distribution and intensity of storm centres on the Earth's surface. The resolution of the obtained map depends directly on the number of spectrum distribution parameters obtained at the stage of signal decomposition and noise level occurring during measurement. Map ambiguities depend on the form of base groups of field distribution, i.e. they are a derivative of the assumed propagation model.

The set of observation parameters $p_k$, $f_k$, $\gamma_k$ and $e_k$ which has been confirmed by other sources and/or with other methods of monitoring storm activity on the Earth's surface can be added to the model database B 390 and in this way constitute a supplement to the set of base parameters $p_{ok}$, $f_{ok}$, $\gamma_{ok}$ and $e_{ok}$ for consecutive reconstructions of the location and intensity of discharge sources or storm centres.

In the case when many receiving apparatuses are applied, which significantly increases the resolution capability of storm centre location and intensity on the Earth surface map, data can be sent by satellite or Internet link to a data collection centre where they are subjected to analysis in the counting unit.

The solution according to this invention was presented with selected examples. However, these examples do not limit the invention. It is obvious that modifications can be introduced without changing the essential nature of the solution. The presented examples are not the only possibilities of application of the solution according to the invention.

The invention claimed is:

1. A method for monitoring storm activity on the Earth's surface in real time with an analysis of electromagnetic signals induced by electrical spark discharges in the atmosphere in storm cells, wherein Extremely Low Frequency (ELF) electromagnetic field signals generated in an Earth-ionosphere resonator are received via two active magnetic induction antennas (A$_x$, A$_y$) and subsequently recorded (211), said recorded signals are subjected in an electronic data processing unit to spectral analysis (212) with the generation of their power spectra (Sx, Sy), characterized in that the method comprises further the steps of: in the electronic data processing unit:

matching the power spectra (Sx, Sy) with resonance curves to parametrize the power spectra (213) by a set of observation parameters ($p_k$, $f_k$, $y_k$ and $e_k$), based on ELF field resonance propagation models in the Earth-ionosphere resonator, comparing the observation parameters ($p_k$, $f_k$, $y_k$ and $e_k$) dependent on distance and intensity of the electrical spark discharges with base parameters ($p_{ok}$, $f_{ok}$, $y_{ok}$ and $e_{ok}$) contained within a model parameter database (214), wherein the base parameters selected as the best approximation to the observation parameters ($p_k$, $f_k$, $y_k$ and $e_k$) dependent on distance and intensity of the electrical spark discharges, are used for developing a map ($M_{(x, y)}$) of location and intensity of the electrical spark discharges (216).

2. The method according to claim 1, characterised in that the ELF electrical field signals induced by the electrical spark discharges are recorded in an Earth zone that is free from local sources of electrical fields, by the two active magnetic induction antennas (Hx, Hy), placed horizontally and preferably perpendicular in respect to each other, and located on the Earth's surface, or close under the ground surface along NS and EW directions, then these signals having been amplified, filtered and processed at a sampling frequency of 180 Hz into digital observation signals (U$_x$, U$_y$) are transmitted by radio to the electronic data processing unit as ELF electromagnetic field signals.

3. The method according to claim 1, wherein the model parameter database is created with the knowledge of an ELF wave propagation model in the Earth-ionosphere cavity.

4. The method according to claim 1, wherein the base parameters are selected as the best approximation to the observation parameters ($p_k$, $f_k$, $y_k$ and $e_k$) using a minimisation procedure with respect to the deviation of the observation parameters ($p_k$, $f_k$, $y_k$ and $e_k$) from the base parameters ($p_{ok}$, $f_{ok}$, $y_{ok}$ and $e_{ok}$).

5. The method according to claim 1 characterised in that each of power spectra (S$_x$, S$_y$) is matched with resonance curves expressed by the formula:

$$S(\omega) = b + \frac{a}{\omega^\alpha} + \sum_{k=1}^{K} \frac{p_k \cdot [1 + e_k \cdot (\omega_k - \omega)]}{(\omega_k - \omega)^2 + (\Gamma_k)^2}$$

where:

$S(\omega)$—matched power spectrum;
a—parameter describing background colour noises;
b—parameter describing background broad-band noises;
$\alpha$—spectral index of colour noises;
$\omega$—rate (pulsation);
$P_k$—maximum power value of k-th resonance peak;
$\theta_k$—parameter of asymmetry of k-th resonance peak;
$UJ_k$—resonance rate of k-th resonance peak which is equal to $2\pi f_k$;
$F_k$—half-width of k-th resonance peak.

6. The method of claim 1, wherein said received ELF signals are recorded on two identical electrical processing paths, with each processing path being provided with a respective amplifier ($G_x$, $G_y$) and a respective filter ($BPF_x$, $BPF_y$) and each processing path processing a respective signal, that is present thereon, at a sampling frequency, into observation signals ($U_x$, $U_y$) that subsequently are provided to the electronic data processing unit.

7. An apparatus for monitoring storm activity on the Earth surface in real time, comprising
antennas, a block recording Extremely Low Frequency (ELF) observation signals, a radio transmission system and an electronic data processing unit, whereby the antennas are two active magnetic induction antennas ($A_x$, $A_y$), preferably situated perpendicularly in respect to each other, preferably along NS and EW direction, and located on the surface, or close under the ground surface,
characterized in that
the antennas are connected via screened wires to the block recording observation signals ($H_x$, $H_y$), and which contains two identical signal paths with amplifiers ($G_x$, $G_y$), filters ($BPF_x$, $BPF_y$), analog-to-digital converters ($A/C_x$, $A/C_y$) and a control system (uP) whose clock is synchronised, via the system receiver, with GPS time,
wherein the electronic data processing unit is adapted to process
an algorithm applying a spectral analysis to the ELF observation signals for the generation of their power spectra ($S_x$, $S_y$) (212)
an algorithm for matching the power spectra ($S_x$, $S_y$) with resonance curves to parametrize the power spectra (213) by a set of observation parameters ($p_k$, $f_k$, $y_k$ and $e_k$), based on ELF field resonance propagation models in the Earth-ionosphere resonator,
an algorithm for comparing the observation parameters ($p_k$, $f_k$, $y_k$ and $e_k$) dependent on distance and intensity of electrical spark discharges in storm cells with base parameters ($p_{ok}$, $f_{ok}$, $y_{ok}$ and $e_{ok}$) contained within a model parameter database (214), wherein the base parameters selected as the best approximation to the observation parameters ($p_k$, $f_k$, $y_k$ and $e_k$) dependent on distance and intensity of the electrical spark discharges, are used for developing a map ($M_{(x, y)}$), of location and intensity of the electrical spark discharges (216).

8. The apparatus according to claim 7 characterized in that the block recording observation signals is connected to the transmitting antenna transmitting data processed in the analog-to-digital converter whereas the counting unit is connected to the receiving antenna communicating with the transmitting antenna connected to the block recording observation signals.

* * * * *